United States Patent [19]
Mason, Jr.

[11] Patent Number: 5,884,098
[45] Date of Patent: Mar. 16, 1999

[54] RAID CONTROLLER SYSTEM UTILIZING FRONT END AND BACK END CACHING SYSTEMS INCLUDING COMMUNICATION PATH CONNECTING TWO CACHING SYSTEMS AND SYNCHRONIZING ALLOCATION OF BLOCKS IN CACHING SYSTEMS

[75] Inventor: Robert S. Mason, Jr., Holliston, Mass.

[73] Assignee: EMC Corporation, Hopkinton, Mass.

[21] Appl. No.: 634,419

[22] Filed: Apr. 18, 1996

[51] Int. Cl.[6] .............................. G06F 13/20; G06F 13/14
[52] U.S. Cl. ......................... 395/872; 395/821; 711/113; 711/14
[58] Field of Search ..................................... 395/821, 800, 395/872, 600, 427, 441, 445, 474; 711/114, 113

[56] References Cited

U.S. PATENT DOCUMENTS

| | | | |
|---|---|---|---|
| 4,445,174 | 4/1984 | Fletcher | 364/200 |
| 5,163,131 | 11/1992 | Row et al. | 395/200 |
| 5,257,367 | 10/1993 | Goodlander et al. | 395/600 |
| 5,355,453 | 10/1994 | Row et al. | 395/200 |
| 5,396,596 | 3/1995 | Hashemi et al. | 395/250 |
| 5,590,301 | 12/1996 | Guenthner et al. | 395/412 |
| 5,673,394 | 9/1997 | Fenwick et al. | 395/200.08 |
| 5,710,937 | 1/1998 | Kasahara | 395/800 |

OTHER PUBLICATIONS

D. A. Patterson, G. Gibson and R. H. Katz, "A Case for Redundant Arrays of Inexpensive Disks (RAID)," Proc. SIGMOD International Conf. on Management of Data, vol. 17, No. 3, Sep. 1988, pp. 109–116.

Primary Examiner—Thomas C. Lee
Assistant Examiner—Rehana Perveen
Attorney, Agent, or Firm—Wolf, Greenfield & Sacks, P.C.

[57] ABSTRACT

A disk drive array controller generally has a host I/O port configured for connection to a host computer and a plurality of disk I/O ports configured for connection to a corresponding plurality of disks forming a disk drive array. A controller constructed in accordance with various aspects of the present invention may include a host I/O processor in communication with the host I/O port and configured to perform I/O transactions with the host computer through the host I/O port; a cache memory; a front end caching subsystem in communication with the host I/O processor and configured to cache blocks of data comprising host I/O transactions in the cache memory; a disk array I/O processor configured to access host data in the cache memory and in communication with the plurality of disk drives, the disk array I/O processor processing host I/O transactions into disk I/O transactions; and a back end caching subsystem in communication with the disk array I/O processor, the back end caching subsystem configured to cache disk array metadata in the cache memory. Variations of this basic system are possible, and contemplated as within the scope of the present invention. The disk drive array controller may further include a communication path between the front end caching subsystem and the back end caching subsystem, whereby allocation of blocks in the caching subsystems are synchronized. The communication path may be, for example, a control store common to the front end caching subsystem and the back end caching subsystem, the control store holding a data structure through which caching and I/O transaction information are communicated between the front end caching subsystem and the back end caching subsystem.

19 Claims, 4 Drawing Sheets

RAID CONTROLLER SYSTEM UTILIZING FRONT END AND BACK END CACHING SYSTEMS INCLUDING COMMUNICATION PATH CONNECTING TWO CACHING SYSTEMS AND SYNCHRONIZING ALLOCATION OF BLOCKS IN CACHING SYSTEMS

FIELD OF THE INVENTION

The present invention pertains to improvements in disk array controller systems, for example using redundant arrays of inexpensive disks (RAID). More particularly, the present invention relates to the caching of data and meta-data in controllers implementing the RAID Level 5 architecture.

BACKGROUND OF THE INVENTION

Many workers in the computer and computer peripheral arts are today trying to push the price/performance/reliability envelope of computer systems further than ever before. State of the art systems require ever increasing on-line storage capacity and reliability without a corresponding detrimental impact on speed. In order to provide access to such ever increasing volumes of data at a reasonable speed and cost, many new technologies have been developed. One very popular storage technology is redundant arrays of inexpensive disks (RAID).

The technology behind RAID includes both a general hardware architecture and a disk array controller firmware architecture. With respect to the disk controller firmware architecture, one of the more popular architectures is RAID Level 5. The RAID Level 5 architecture, as well as RAID generally and the various RAID Levels, are described in detail in Patterson et al., "A Case for a Redundant Arrays of Inexpensive Disks (RAID)", ACM SIGMOD Conference, Chicago, Jun. 1–3, 1988, incorporated herein by reference.

Figure 3:
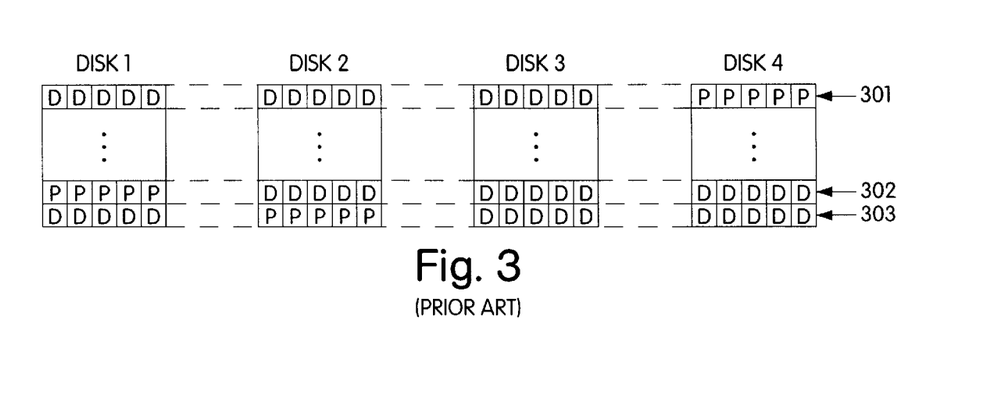
FIG. 3 is a data storage map illustrating an example RAID Level 5 data set including three data disks and one parity disk, and having a stripe width of five.

As described therein, disk data are divided into stripes. See also FIG. 3, which illustrates a RAID Level 5 disk set including four disks, DISK1 –DISK4, and a stripe width of five blocks. Stripes 301, 302, and 303 contain data of two kinds, host data D and meta-data P. Host data D, which is the information stored, retrieved and manipulated by the host computer, is for convenience referred to hereinafter simply as data D. Meta-data P is used exclusively by the disk array controller and perhaps other disk subsystem components for the control and maintenance of the disk array system. For example, one type of meta-data P may be parity information. Stripes are recorded as sequential blocks on a plurality of different disk drives. Each stripe includes a plurality of data blocks D and one additional set of blocks called parity blocks P. The parity blocks P contain the logical exclusive-OR (XOR) of the plurality of data blocks D, and is recorded on an additional disk drive. Conventionally, the parity blocks P are distributed among all the disk drives of an array, as shown in FIG. 3, in order to avoid drive contention during write operations. The use of parity blocks P improves availability of all of the data in a stripe. When one drive is unavailable, for example, the missing data block from a stripe can be reconstructed from the parity block and the available data blocks. The contents of the parity block is simply XORed with the data blocks remaining. The result of this XOR operation is the data from the missing drive. Once such a drive has been repaired, data can be restored to the repaired drive using the parity blocks and data blocks from each good drive in similar fashion.

Figure 1:
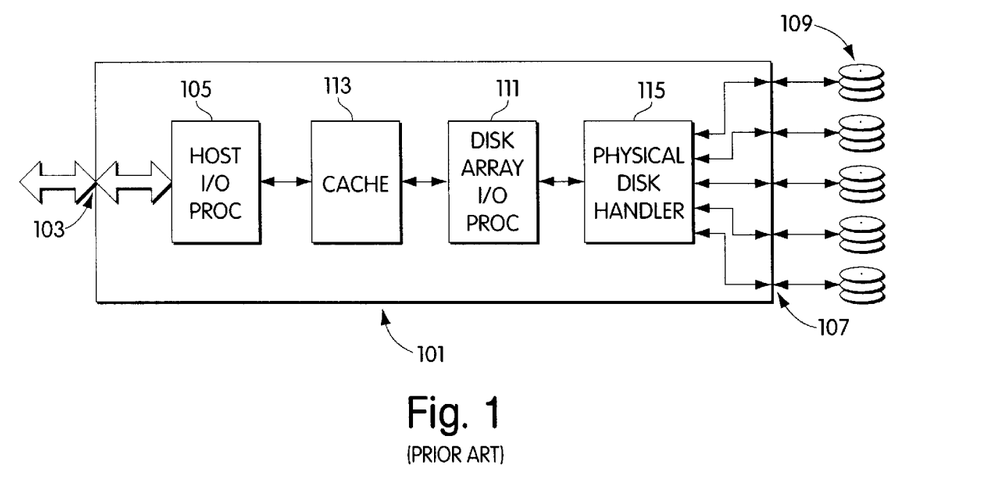
FIG. 1 is a block diagram of a conventional RAID disk controller having a front end cache.

A typical RAID-based disk controller 101 is shown in FIG. 1. The controller is connected to a host computer (not shown), through a host port 103. Input/output (I/O) transactions are received through the host port by a host I/O processor 105. The host I/O processor is responsible for receiving commands from the host computer to the RAID array and for transferring data and command status responses from the RAID array back to the host computer. Commands from the host computer are typically requests to perform an operation on a number of blocks, i.e., a logical block count (LBC), beginning with a specified logical block address (LBA) within the RAID array.

The RAID disk controller also has a disk array interface port 107 which communicates with a plurality of physical disk drives 109. Data I/Os and other commands to be executed by the physical disk drives of the RAID array are processed by a disk array I/O processor 111 executing RAID Level 5 algorithms. The host commands relating to logical locations (LBA, LBC) are processed into a plurality of physical I/O operations which are in turn processed by a physical disk handler 115 into physical I/O commands for specific physical disk drives 109. For example, a disk write of several blocks may be organized into stripes and divided into individual disk I/O operations. Such common operations are described in detail in Patterson et al.

In order to improve the efficiency of RAID controllers, it has become a common practice to provide a cache 113, logically disposed between the host I/O processor 105 and the disk array I/O processor 111. For example, Row et al. In U.S. Pat. No. 5,163,131, issued Nov. 10, 1992, describe an architecture for a large file server including a front end cache. Goodlander et al. disclose a front end caching system in the context of a data storage system including a plurality of disk drives, in U.S. Pat. No. 5,257,367. The caching system 113 is typically a separate software process or set of subroutines using the same system logical block references as the host I/O processor 105 because the data cached is that data frequently requested by the host computer. Therefore, use of logical block references by the cache 113 is most efficient. Caching of data is helpful because the host may request data from the same logical location many times without modification. When such frequently requested data is found in the cache 113, it may be sent to the host port by the host I/O processor 105 without having to perform a physical I/O to the RAID array. Such a cache 113 may also be helpful during write operations because valid old data which has been previously cached need not be retrieved from the physical disks to be XORed with the parity stripe before overwriting. The valid old cached data can be XORed with the parity stripe and then the new data both cached and written to the physical disks. Also caching of write operations permits the disk array controller to report command completion very quickly, an operation referred to as "fast writes".

One problem with conventional RAID disk controller design is that a write operation is usually preceded by at least one disk drive read operation in order to retrieve the parity stripe from the RAID array. Sometimes this problem is solved by consolidating writes into full-stripe writes, wherein a new parity is generated for the full stripe. However, there is no assurance that a full-stripe write, or optimized write, as it is known in the art, will always be obtained from consolidations of host write commands.

As discussed above, systems with no caching and systems with only front end caching are known. Systems with only back end caching are also known. However, front end caches have never been combined with back end caches. Workers in this field of art have not combined front end caches and back end caches in a single RAID disk controller system because such a combination was not thought to provide an advantage warranting the additional cost and complexity of the resulting system. It was recognized that the front end cache would improve the host I/O performance and the back end cache would improve the disk array I/O performance during write operations, but the advantages are outweighed by the cost and complexity of additional cache memory, separate cache control systems and potential negative interactions between the front end cache system and the back end cache system. Potential negative interactions include referencing a block multiple times during a single operation, resulting in additional cache look ups.

SUMMARY OF THE INVENTION

The foregoing problems with prior RAID disk controllers are solved by embodiments of the present invention, in which both a front end cache and a back end cache are provided. Communication between the front end cache and the back end cache in embodiments of the present invention is enhanced by using a common cache memory and optionally a common control store for control structures used by each of the front end cache and the back end cache. By caching both data blocks and meta-data blocks, compared to conventional system embodiments of the present invention are expected to offer higher efficiency RAID Level 5 reads and writes measured in terms of transfer rate seen by the host because fewer physical disk accesses will be performed for both read and write operations. Even when optimized writes are not readily consolidated from a plurality of host write commands, caching of both data and meta-data permits more efficient performance of the "read-modify-write", without the necessity for excessive disk I/O operations.

A disk drive array controller generally has a host I/O port configured for connection to a host computer and one or more disk I/O ports configured for connection to a plurality of disks forming a disk drive array. A controller constructed in accordance with various aspects of the present invention may include a host I/O processor in communication with the host I/O port and configured to perform I/O transactions with the host computer through the host I/O port; a cache memory; a front end caching subsystem in communication with the host I/O processor and configured to cache blocks of data comprising host I/O transactions in the cache memory; a disk array I/O processor configured to access host data in the cache memory and in communication with the plurality of disk drives, the disk array I/O processor processing host I/O transactions into disk I/O transactions; and a back end caching subsystem in communication with the disk array I/O processor, the back end caching subsystem configured to cache disk array meta-data in the cache memory. Variations of this basic system are possible, and contemplated as within the scope of the present invention. The disk drive array controller may further include a communication path between the front end caching subsystem and the back end caching subsystem, whereby allocation of blocks in the caching subsystems are synchronized. The communication path may be, for example, a control store common to the front end caching subsystem and the back end caching subsystem, the control store holding a data structure through which caching and I/O transaction information are communicated between the front end caching subsystem and the back end caching subsystem. Alternatively, the communication path may be, for example, a portion of the cache memory accessible to both the front end caching subsystem and the back end caching subsystem.

In accordance with some aspects of the present invention, a disk array controller conforming with RAID Level 5 and having a host I/O port and one or more disk I/O ports may be improved by including a cache memory; a front end cache connected to cache in the cache memory host data transferred through the host I/O port; and a back end cache connected to cache in the cache memory disk drive meta-data transferred through the one or more disk drive I/O ports. Similar variations of this controller are also possible. For example, the controller may further include a communication path between the front end caching subsystem and the back end caching subsystem, whereby allocation of blocks in the subsystems are synchronized. This communication path may also be a control store common to the front end caching subsystem and the back end caching subsystem, the control store holding a data structure through which caching and I/O transaction information are communicated between the front end caching subsystem and the back end caching subsystem. Alternatively, the communication path may be, for example, a portion of the cache memory accessible to both the front end caching subsystem and the back end caching subsystem. In accordance with some variations on this basic controller, the cache memory may further buffer host data during transfers between the one or more disk drive I/O ports and the host I/O port. For example, during writes, the front end cache may maintain separate lists of old and new versions of cached blocks to be written, thus buffering the new blocks for a time until they are transformed into old blocks. Also, during reads a separate buffer memory may not be required for buffering data retrieved from a physical disk drive, as the cache memory may buffer data as it is retrieved. This use of the cache memory may be additionally advantageous in that prefetches directly into the cache memory may be performed when appropriate. Particularly advantageous in embodiments of the present invention is that prefetches of meta-data into the back end cache may be performed. Although the controller may require prefetching to be complete before an operation is considered done, thus delaying a response by the controller indicating the operation as done; prefetching can also be arranged to occur in parallel with other operations, thus not delaying the response of the controller indicating the operation as done when a requested operation is otherwise complete.

Embodiments of the present invention in which some combination of the above-described elements are included may be constructed using specialized electronic hardware, software programs executing on one or more general purpose processors, or a combination of specialized hardware and software executing on one or more processors.

BRIEF DESCRIPTION OF THE DRAWINGS

The construction and operation of the present invention will be made clear by the following detailed description, read in connection with the drawings in which like reference numerals designate like elements, and in which.

DETAILED DESCRIPTION

Figure 2:
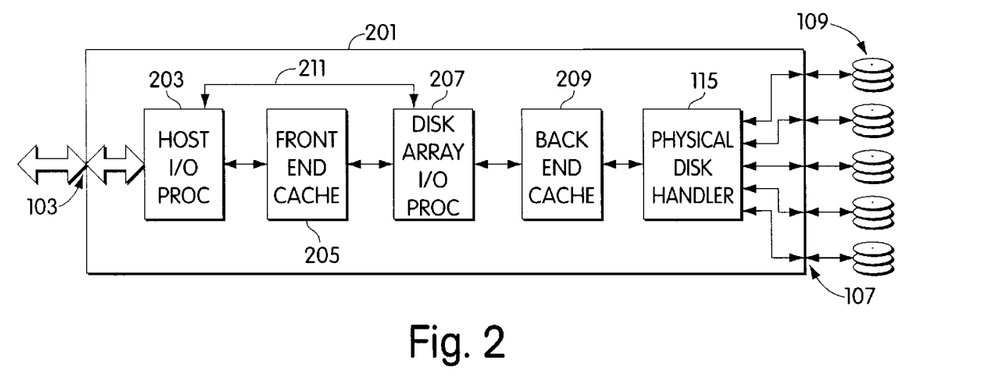
FIG. 2 is a block diagram of a RAID disk controller according to the present invention and having amend and a back end cache.

A RAID disk controller 201 according to the present invention is constructed as a combination of conventional elements which have not heretofore been combined in this way. Each of the elements of controller 201 are individually implemented in a manner known to skilled workers in the disk controller arts. As shown in FIG. 2, a RAID disk controller 201 according to the present invention may be constructed including a host I/O port 103 connected through a host I/O processor 203 to a front end cache 205. The front end cache system 205 is connected through a disk array I/O processor 207 to the RAID array of disks 109 via physical disk handler 115 and disk I/O port 107. Disk I/O port 107 may be comprised of a plurality of physical I/O ports as shown in the Figure, or disk I/O port may be a single port, such as a Small Computer System Interface (SCSI) port to which a plurality of disks 109 may be attached. Also connected between the disk array I/O processor 207 and the physical disk handler 115 is a back end cache 209 in which meta-data is cached. The front end cache 205 is a separate software process or set of subroutines using the same logical block references as the host I/O processor 205, while the back end cache 209 is a second separate software process or set of subroutines using the same logical block references as the disk array I/O processor 207 with which it is most closely in communication. Software processes 205 and 209 execute on one or more microcontrollers which exercise control over all of disk controller 201. Each microcontroller may, for example, be an Intel Pentium® or PowerPC device, a MIPS processor, a Motorola 680X0 series or 88K device, or another suitable processor. The software processes 205 and 209 may be multitasking and multi threaded.

It should be noted at this point that the block diagrams of FIGS. 1 and 2 show the functional relationships between the illustrated software and hardware elements. They are not data-centric, in the sense that some of the communication paths shown do not involve an actual movement of data. The blocks shown are functional hardware elements or elements including software executing on a processor. The construction of each individual functional block is well-known, involving only conventional design techniques. Disk drive controllers typically include one or more microprocessors or other microcontrollers on which software programs execute. They may be any suitable type, including an Intel Pentium® or PowerPC device, a MIPS processor, a Motorola 680X0 series or 88K device, or any other processor found suitable by a skilled designer. The software processes discussed herein constitute part of a software program executing on the microprocessors or microcontrollers.

In the present invention, as shown in the embodiment of FIG. 2, there is only one physical cache memory used for both the front end cache 205 and the back end cache 209. Disk blocks transferred from the disk array 109 into the controller 201 are stored in the cache memory under the control of the appropriate one of the front end cache 205 and the back end cache 209, as described in detail below. The use of a single cache memory provides an advantage when disk controller operations require access to blocks under the control of the front end cache as well as blocks under the control of the back end cache, as will be seen below. A single point of access, such as provided by a single cache memory allows a single processor, such as the microprocessor mentioned above, to more easily perform computations in which data and meta-data are used. For example, the processor could readily perform memory-to-memory logical and arithmetic operations as well as memory-to-memory moves. While it is possible to use multiple cache memories, the above mentioned advantages of a single point of access to cached data end cached meta-data are lost.

Although only one cache memory is used, the front end cache 205 and the back end cache 209 may either share a single control store or use separate control stores to hold control structures such as a least recently used (LRU) block queue. For convenience, the following description refers to the queue of blocks available in each cache system simply as a front end cache block list and back end cache block list. LRU queue algorithms and techniques are well known. One simple LRU queue algorithm is described next.

An LRU cache block list may be a data structure configured as a doubly linked list holding a pointer to each cache block currently allocated in the cache memory. When a block which is already in the queue is used, the entry for that block in the list is moved to the head of the list. The entry in the list corresponding to the block which is used at the earliest time (or even never used) eventually moves to the last position in the list. When the cache memory becomes full, subsequent attempts to allocate cache blocks cause the last entry in the list to be removed, deallocating the cache block pointed to. The cache memory block previously pointed to by the last entry in the list is then replaced with the new block for which allocation was attempted and an entry for the new block placed at the head of the list.

In order to optimize the performance of this structure, it is desirable to coordinate the operations performed by the front end cache 205 and the back end cache 209. Because the front end cache 205 is on the host side of the disk I/O processor 203, meta-data is never stored by the front end cache 205. Conventionally, the host computer never has any knowledge of or direct access to disk meta-data. The meta-data is closely tied to the physical arrangement of the disk drive array, of which the host computer has no knowledge. Thus, meta-data would never appear in the blocks passed by the host computer to the front end cache 205. The front end cache 205 stores logical blocks of host data, as would be understood by the host computer. The blocks stored in the cache memory by the front end cache 205 are found by reference to the cache block list discussed above. However, some RAID operations involve both data and corresponding meta-data. In the prior art, the need to always read meta-data from the physical disks resulted in significant inefficiencies because at least one physical I/O was always required for operations involving both data and meta-data, even when a conventional front end cache was used.

Therefore, in the architecture according to this aspect of the present invention, there is a communication path 211 established between the front end cache 205 and the back end cache 209. When blocks are allocated or deallocated in the front end cache 205 corresponding to particular logical blocks, corresponding blocks are allocated or deallocated in the corresponding back end cache for the parity blocks corresponding to the affected stripes.

The communication path 211 established between the front end cache 205 and the back end cache 209 may take one of several forms. There may be dedicated communications hardware built into the disk array controller 201 between the front end cache 205 and the back end cache 209. For example, the front end cache 205 may be controlled by one microprocessor and the back end cache may be controlled by a second microprocessor. These microprocessors may communicate over a dedicated serial line. Alternatively, the two processors may be merged into a single hardware entity performing both functions, for example in response to a multitasking software system. In this arrangement, the front end cache 205 end back end cache 209 may communicate through global variables or other structures of the multitasking executive. The processors may communicate through a system bus or communication may take place through a shared memory arrangement. One suitable shared memory arrangement is to store information to be communicated in a location in the cache memory, accessible to both the front end cache 205 and the back end cache 209.

The presently preferred communication path 211 is a common data structure residing in a common control store accessible to both the front end cache 205 and the back end cache 209. The structure is created when an I/O request is received and destroyed when the I/O request is complete. The structure holds pointers to front end cache blocks and back end cache blocks, the original I/O request parameters and various other statistics which the skilled artisan may find useful in a particular controller design, but which are not related to the construction or operation of the present invention. However, the choice of communication path which is optimized for any particular embodiment of the invention is left to the skilled artisan.

Figure 4:
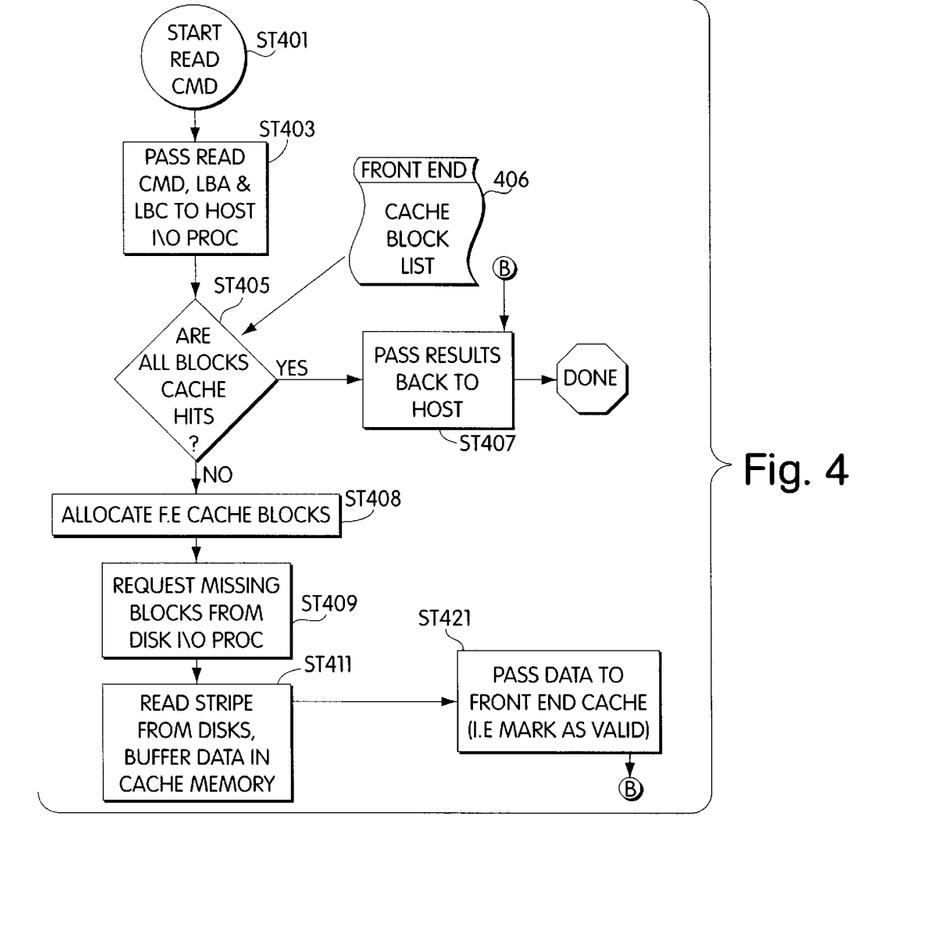
FIG. 4 is a flow chart of a RAID Level 5 read operation performed using the disk controller cording to the present invention.
Figure 5:
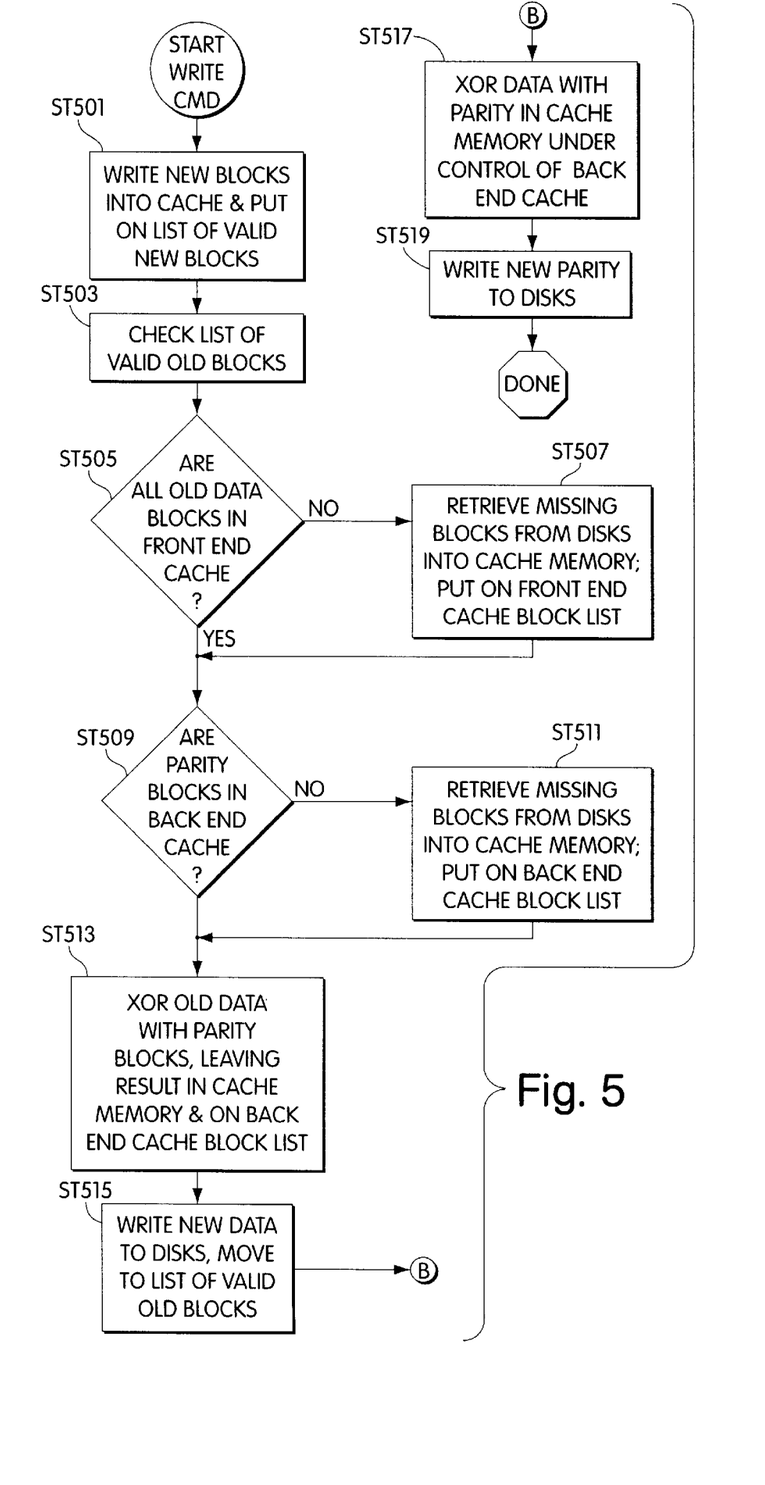
FIG. 5 is RAID Level 5 write operation performed using a disk controller according to the present invention.
Figure 6:
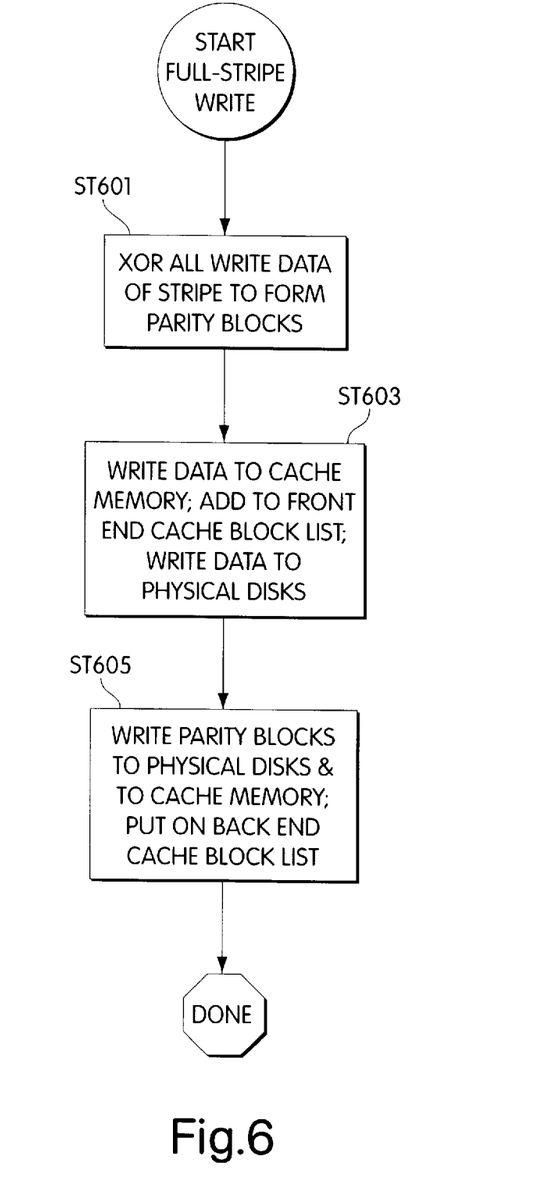
FIG. 6 is an optimizing RAID Level 5 write operation performed with a disk controller according to the present invention.

The operation of this aspect of the present invention is now described with reference to FIGS. 4–6. First, a host read command is described, followed by a host write command.

When the host issues a read command in step 401 to the RAID array through the host port, a logical block address (LBA) and a logical block count (LBC) are passed in step 403 to the host I/O processor. The front end cache then checks in step 405 the list of allocated blocks 406 in the front end cache against the list of blocks requested, to determine if a cache hit has occurred. If all of the logical blocks requested result in cache hits, then the request is immediately filled in step 407 by a response to the host through the host port (FIG. 2, 103). If a cache miss occurs for at least part of the request, then cache memory is allocated in step 408 by the front end cache (FIG. 2, 205) for the block causing the cache miss, as well as for blocks in the back end cache into which parity blocks may be prefetched, as discussed below. The blocks which caused the cache miss are requested in step 409 from the disk I/O processor (FIG. 2, 207). The request in step 409 includes passing a data structure containing pointers to the allocated front end cache blocks, back end cache blocks, original request parameters and various other statistics, in the control store, to the disk I/O processor (FIG. 2, 207). The disk I/O processor formats the request as one or more disk I/O operations and performs in step 411 one or more disk read operations to obtain the requested data and store it in the cache memory at the allocated locations.

Whenever blocks are retrieved from the physical disk drives, prefetching may be performed. If the host I/O command requested a read of a series of blocks, it is known to those skilled in this art that it is likely that a subsequent host I/O read command will be directed to immediately following blocks. Therefore, some time may be saved, enhancing performance, by prefetching or reading some additional blocks following the ones actually requested. It is also known that a write (which involve parity blocks, also) often follows a read of a block. Therefore a parity block may be prefetched into the back end cache 209. Those skilled in this art may permit the RAID disk array controller to return a done response before the prefetch is completed or after the prefetch is completed, depending upon individual design requirements.

If a read operation fails, it is retried until it succeeds or is declared a total failure. If total failure of one of the disk read operations is detected in step 411, then data will be reconstructed using the corresponding parity block of the stripe in which the failure occurred. In the event of such a failure, the disk I/O processor will perform an I/O requesting a parity block of the stripe in which the failure occurred. The back end cache must then determine whether the parity block has already been cached by referring to the back end cache block list. The parity block of the stripe is read, if not already cached, as determined by referring to the back end cache block list. If a parity block for the stripe is in the back end cache, that read I/O operation may be avoided. Any parity blocks read from physical disks during prefetches, writes or read failures are cached in the back end cache and listed on the back end cache block list. The remaining blocks of the stripe in which the failure occurred are read and cached in the front end cache (FIG. 2, 205). Then, all the blocks of the stripe in which the failure occurred except the failed block are XORed together with the corresponding parity block. Regardless of whether reconstruction of a failed or missing block is performed, valid data is then passed to the front end cache in step 421 by marking the blocks valid in the front end cache block list 406. When all of the requested data has been successfully retrieved into cache memory and validly placed on the front end cache block list in step 421, the data is returned to the host computer through the host port in step 407.

When the host issues a write command, the process is a bit more complicated because, as discussed by Patterson et al., RAID Level 5 writes are generally read-modify-write operations due to the handling required for the parity stripe. Optimized writes are described below which do not also require a read operation.

In brief, a write operation is executed as follows. The old data corresponding to the blocks to be written is first read either from the physical disks or from the front end cache. The old data is XORed with the old parity information, which may be read either from the physical disks or from the back end cache. The new data is cached in the front end cache and written to the physical disks. Finally, the new data is XORed with the parity information remaining, to form new parity information, which is then cached in the back end cache and written to the physical disks.

As can be seen from the above brief description, the front end cache must maintain two cache lists. One is the list of blocks allocated to old data which is being overwritten. The old data must be preserved long enough to use to XOR with the old parity information. The second is the list of blocks allocated to the new data which is overwriting the old data. The blocks on this list will become the cached data for the logical blocks involved at the end of the write operation.

The write operation is now described in detail with reference to FIG. 5.

When a write command is received from the host, through the host I/O port, it is accompanied by one or more new blocks to be written to the RAID array. The new blocks are first written into cache memory by the front end cache in step 501. The allocated blocks are put on a list of valid new blocks 502. As will be seen, the front end cache maintains two lists of valid blocks, valid new blocks 502 and valid old blocks 406. These are both used during write operations. During read operations such as described above in connection with FIG. 4, the list of valid old blocks 406 is maintained in the same manner as the list of valid blocks of a conventional cache system.

Since conventional RAID Level 5 writes as described by Patterson et al. are in principle read-modify-write operations, next the list of valid old blocks 406 is checked in steps 503 and 505. If some old blocks included among the blocks to be written are missing from the list, i.e. a cache miss occurs for those blocks, then they are retrieved from the physical disks into the front end cache in step 507. In either case, processing simply proceeds to step in step 509. A similar operation to the one just described for the front end cache is then performed by the back end cache. The back end cache block list 508 is checked for the required parity blocks for the requested write in step 509, and any missing parity blocks are retrieved from the physical disks into the cache in step 511.

It should be noted at this point that the write command and the new blocks of write data do not arrive through the host I/O port at the same time. The write command generally arrives first to place the controller 201 into the proper state to receive blocks of host data into the front end cache 205, with various write parameters including the LBA and LBC information. Therefore, receiving the new blocks of write data may occur in parallel with retrieving through the disk I/O port any old blocks missing from the list of valid old blocks 406. Those skilled in this art will understand that without departing from the spirit of the invention, various other optimizations may be implemented which take advantage of the two-port nature of the RAID controller architecture described, the ordering of host commands, etc. For example, data end parity I/O operations can be consolidated, parity blocks can be retrieved before data blocks, etc.

Furthermore, prefetching of both data blocks and meta-data blocks can occur at this point. Prefetching has been explained briefly above. Prefetching of meta-data blocks is a unique advantage of the present invention. By providing a back end caching system which is coordinated with the front end caching system, the present invention allows the back end cache to have sufficient knowledge of a host I/O command to determine what meta-data blocks should be prefetched.

Processing continues with the first part of the "modify" portion of the RAID Level 5 read-modify-write operation. The old data blocks now present in cache memory are XORed with the parity blocks now present in cache memory to remove the old data from the parity block in step 513. The result of step 513 is retained in cache memory under control of the back end cache, without writing it out to the physical disks.

The new data blocks may now be written to the physical disks in step 515. When the new data blocks are written to the physical disks, the new data blocks become, in effect, "old" data. Therefore, pointers to the cached "new" data are moved to the list of valid old data blocks, while the pointers to the now-obsolete data for the written blocks are removed from the list of valid old data blocks.

The second part of the "modify" portion of the read-modify-write operation now occurs. The data blocks just written to the physical disks are XORed in step 517 with the parity blocks in cache memory to form the new parity blocks corresponding to the data actually written to the physical disks. These parity blocks are finally written in step 519 to the physical disks, completing the requested write command.

Write operations may be made much simpler if it can be determined that all the blocks in a stripe are being written. Use of both consolidation of writes and prefetching, as now known by those skilled in this art, help ensure that more writes will be of all the blocks in a stripe. When all the blocks in a stripe are to be written, the "read-modify-write" operation becomes simply a "calculate-write" operation known in the art as an optimized write. If caching is done in the front end cache on a stripe-by-stripe basis, it is possible to force this to be the case, even when the host does not request a write to an entire stripe. The process for a full stripe write, as shown in the flow chart of FIG. 6, is as follows. First, XOR all the new data together to form the parity blocks and store them in the back end cache in step 601, i.e. the "calculate" part of the operation. Next, in step 603, write all the new data which has been received into the front end cache to the data blocks of the physical disks. The front end cache places pointers to these blocks of cache memory on the list of valid old blocks. Finally, write the parity blocks to the parity disk for the stripe in step 605. Of course, the order of these steps can be altered to meet other needs as may be determined by those skilled in this art. In this operation, all the data and meta data blocks are subsequently retained in the front end cache (FIG. 2, 205) and back end cache (FIG. 2, 209), respectively.

Whenever a physical I/O request is for a data block, it is stored in the blocks of cache memory previously allocated by the front end cache for the data block. An I/O request for a parity block, for example, when a disk drive fails or during a partial stripe write, is either supplied out of cache memory by the back end cache, if there is a cache hit, or performed through the disk port, if there is a cache miss.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto.

What is claimed is:

1. In a disk drive array control system having a host I/O port configured for connection to a host computer and at least one disk I/O port configured for connection to a plurality of disks forming a disk drive array, a controller comprising:

a host I/O processor in communication with the host I/O port and configured to perform I/O transactions with the host computer through the host I/O port;

a cache memory;

a front end caching subsystem in communication with the host I/O processor and configured to cache blocks of data comprising host I/O transactions in the cache memory;

a disk array I/O processor configured to access host data in the cache memory and in communication with the plurality of disk drives, the disk array I/O processor processing host I/O transactions into disk I/O transactions;

a back end caching subsystem in communication with the disk array I/O processor, the back end caching subsystem configured to cache disk array meta-data in the cache memory; and a communication path between the front end caching subsystem and the back end caching subsystem, whereby allocation of blocks in the caching subsystems are synchronized.

2. The controller of claim 1, wherein the communication path further comprises:

a control store common to the front end caching subsystem and the back end caching subsystem, the control store holding a data structure through which caching and I/O transaction information are communicated between the front end caching subsystem and the back end caching subsystem.

3. The controller of claim 1, wherein the communication path further comprises:

a location within the cache memory common to the front end caching subsystem and the back end caching subsystem, the location holding a data structure through which caching and I/O transaction information are communicated between the front end caching subsystem and the back end caching subsystem.

4. The controller of claim 1, wherein the communication path further comprises:

dedicated communication hardware through which data is transferred between the front end caching subsystem and the back end caching subsystem.

5. The controller of claim 1, wherein the communications path further comprises:

a system bus through which data is transferred between the front end caching and the back end caching subsystem.

6. In a RAID Level 5 disk array controller having a host I/O port and at least one disk drive I/O port, the improvement comprising:

a cache memory;

a front-end cache connected to cache in the cache memory host data transferred through the host I/O port;

a back-end cache connected to cache in the cache memory disk drive meta-data transferred through the plurality of disk drive I/O ports; and a communication path between the front end caching subsystem and the back end caching subsystem, whereby allocation of blocks in the subsystems are synchronized.

7. The controller of claim 6, wherein the cache memory further buffers host data during transfers between the plurality of disk drive I/O ports and the host I/O port.

8. The controller of claim 6, wherein the communication path further comprises:

a control store common to the front end caching subsystem and the back end caching subsystem, the control store holding a data structure through which caching and I/O transaction information are communicated between the front end caching subsystem and the back end caching subsystem.

9. The controller of claim 6, wherein the communication path further comprises:

a location within the cache memory common to the front end caching subsystem and the back end caching subsystem, the location holding a data structure through which caching and I/O transaction information are communicated between the front end caching subsystem and the back end caching subsystem.

10. The controller of claim 6, wherein the communication path further comprises:

dedicated communication hardware through which data is transferred between the front end caching subsystem and the back end caching subsystem.

11. A RAID compliant disk drive array controller having a host I/O port configured for connection to a host computer and at least one disk I/O port configured for connection to a plurality of disks forming a disk drive array, the RAID controller using blocks of meta-data in connection with controlling the disk drive array, the controller comprising:

a front end subsystem in communication with the host I/O port which transfers blocks of host data between the cache memory and the host I/O port, the front end subsystem including a caching system which stores and retrieves blocks of host data using the cache memory;

a back end subsystem in communication with the disk I/O port which transfers blocks of host data between the cache memory and the disk I/O port, the back end subsystem including a caching system which stores and retrieves blocks of meta-data the cache memory; and a communication link between the front end subsystem and the back end subsystem, whereby allocation of blocks in the caching subsystems are synchronized.

12. The controller of claim 11, wherein the communication link further comprises:

a control store holding a data structure accessible to both the front end subsystem and the back end subsystem.

13. The controller of claim 14, wherein the communication link further comprises:

a location in the cache memory holding a data structure accessible to both the front end subsystem and the back end subsystem.

14. The controller of claim 11, wherein the communication link further comprises:

a system bus connected between the front end subsystem and the back end subsystem.

15. In a RAID compliant disk drive array control system having a host I/O port configured for connection to a host computer and at least one disk I/O port configured for connection to a plurality of disks forming a disk drive array, the RAID controller using blocks of meta-data in connection with controlling the disk drive array, a controller comprising:

a cache memory;

a front end subsystem in communication with the host I/O port which transfers blocks of host data between the cache memory and the host I/O port, the front end subsystem including a caching system which stores and retrieves blocks of host data using the cache memory;

a back end subsystem in communication with the disk I/O port which transfers blocks of host data between the cache memory and the disk I/O port, the back end subsystem including a caching system which stores and retrieves the blocks of meta-data in the cache memory; and a communication link between the front end subsystem and the back end subsystem, whereby allocation of blocks in the caching subsystems are synchronized; and wherein the back end subsystem further comprises:

a disk I/O processor which converts transfers of host data between a host I/O form and a RAID compliant physical disk I/O form.

16. The controller of claim 15, wherein RAID compliance is held to RAID Level 5.

17. In a disk drive array control system having a host I/O port configured for connection to a host computer and at least one disk I/O port configured for connection to a plurality of disk drives, a controller comprising:

a host I/O processor in communication with the host I/O port and through which I/O transactions with the host computer are performed;

a disk array I/O system which receives host I/O transactions, processes host I/O transactions into disk I/O transactions and is connected in communication through the disk I/O port with the disk drives; and a cache system including a cache memory, the cache system in communication with the host I/O processor and in communication with the disk array I/O processor, and the cache system caching in the cache memory blocks of host I/O transaction data and blocks of disk array meta-data; and wherein the cache system further comprises:

a front end cache subsystem receiving host I/O transaction data and storing the host I/O transaction data in the cache memory;

a back end cache subsystem receiving disk array meta-data and storing the disk array meta-data in the cache memory; and a communication path between the front-end caching subsystem and the back-end caching subsystem whereby allocation of blocks in the cache memory are synchronized.

18. The disk drive array controller of claim 17, wherein the caching system initiates prefetches of blocks in response to host I/O transactions.

19. The disk drive array controller of claim 18, wherein the prefetches initiated by the cache system are meta-data blocks needed to perform a host I/O write transaction.

* * * * *